May 20, 1924.
O. HELLAND
1,494,909
COMBINED STEERING AND TOWING DEVICE
Filed April 16, 1920
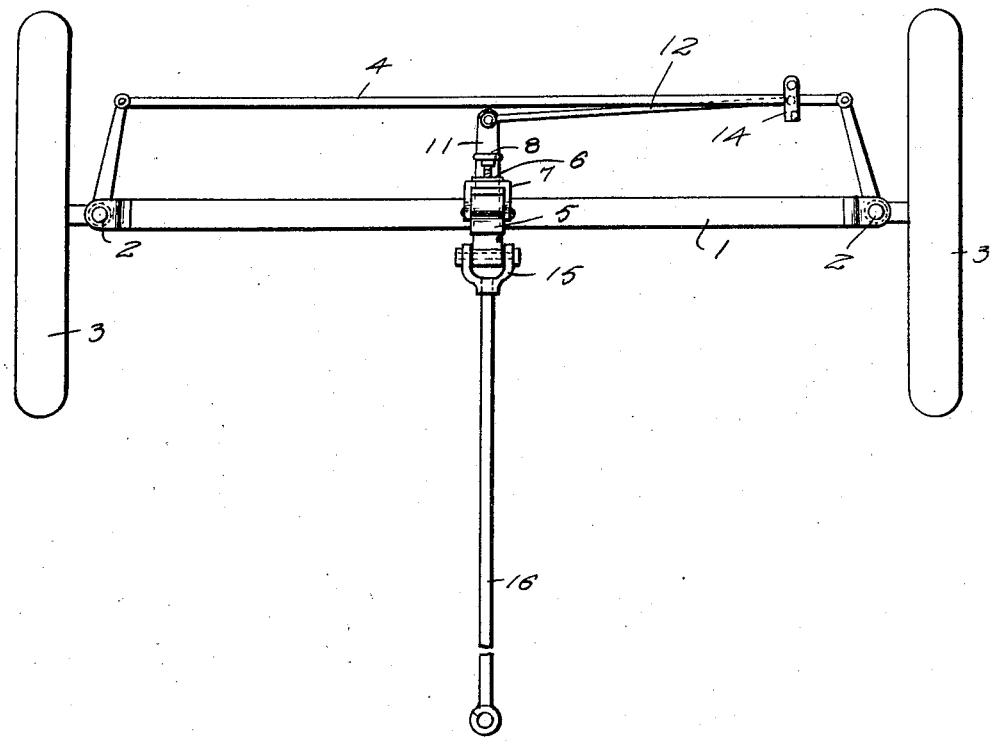
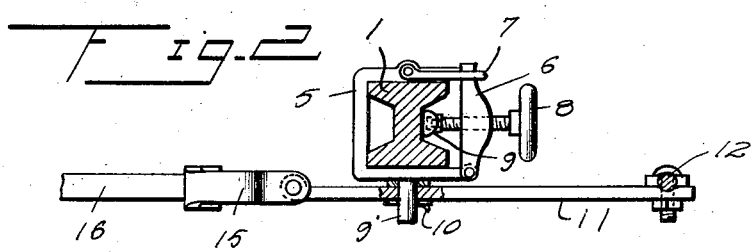
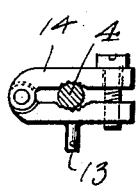
INVENTOR.
O. Helland
BY ATTORNEY.

Patented May 20, 1924.

1,494,909

UNITED STATES PATENT OFFICE.

OLE HELLAND, OF KATHRYN, NORTH DAKOTA.

COMBINED STEERING AND TOWING DEVICE.

Application filed April 16, 1920. Serial No. 374,352.

*To all whom it may concern:*

Be it known that I, OLE HELLAND, a citizen of the United States, residing at Kathryn, in the county of Barnes and State of North Dakota, have invented certain new and useful Improvements in a Combined Steering and Towing Device; and I do hereby declare the following to be a full, clear, and exact description of the invention, such as will enable others skilled in the art to which it appertains to make and use the same.

This invention relates to combined steering and towing devices and it consists in the novel features hereinafter described and claimed.

An object of the invention is to provide a device of the character stated which is of simple structure and for connection with the steering gear of the dead automobile and rigid connection with the rear axle of the relief automobile, the parts being so arranged that as the relief automobile turns, the dead or towed automobile will track approximately in the same path as the relief automobile. Consequently a disabled automobile may be towed without an operator for the steering apparatus thereof.

Servient objects and advantages will appear from the description following.

In the accompanying drawing:—

Figure 1 is a plan view of the combined steering and towing device.

Figure 2 is substantially a side elevation of my improvements in connection with the front axle of a disabled automobile, and Figure 3 is a detail side elevation of the attaching clamp to engage the steering rod of the disabled automobile, the parts secured thereby being shown in section.

As illustrated in the accompanying drawing, the front axle of the disabled or dead machine is indicated at 1. Usual knuckles 2, wheels 3 and steering rod 4 cooperate therewith.

The combined steering and towing device includes an approximately U-shaped frame member 5 which is applied to the intermediate portion of the axle 1 with its branches or end portions disposed rearwardly and transversely across the axle. A closure bar 6 is pivotally connected with one of the ends of the member 5 and may be swung to a position against the rear edge of the axle and held at such position by means of a link latch 7 pivoted to the upper part of the member 5 and adapted to engage over the free end portion of the bar 6 when the same is in position against the axle. A thrust screw 8 is threaded through the intermediate portion of the bar 6 and carries at its inner end a head 9 adapted to bear against the side of the axle when the screw is tightened whereby the member 5 is securely held in position upon the axle 1.

The member 5 is provided at its lower side with a downwardly disposed stud 9′ having a cotter pin 10 passing transversely through the same. A lever 11 is pivoted at a point between its ends upon the stud 9′ and is retained thereon by the cotter pin 10 which is placed in position upon the stud after the lever has been applied to the same. A link 12 is pivotally connected at one end with the rearward end of the lever 11 and pivotally connected at its other end with a stud 13 which is carried by a clamp device 14 applied to the steering rod 4 in the vicinity of one end thereof. A head member 15 is hingedly connected with the front end of the lever 11 for vertical swinging movement and the rear end of a reach bar 16 is attached to the head 15 and the front end of the said reach bar is rigidly connected in any suitable manner to the rear axle of the relief automobile.

When the device is applied with rod 16 rigidly extending from the rear axle of the relief automobile, the wheels 3 of the disabled automobile, are turned or steered correspondingly with those of the relief automobile, the rod 4 moving in the usual manner due to movement of the link 12 imparted by lever 11 which moves laterally with the reach rod 16. Rod 16 may swing vertically upon its pivot at 15 should the automobiles to which the device is applied encounter uneven road surfaces.

Having described the invention what is claimed is:

A steering and towing device embodying a reach bar, a clamp adapted to secure the reach bar to the front axle of a disabled automobile, said clamp comprising a U-shaped frame having arms of different lengths, a stud carried by the long arm of said clamp to which the reach bar is pivotally connected, said clamp being adapted for application to the front axle with its short arm in contact with the upper side of the axle and with its long arm positioned below the axle and with its bight portion in contact with one of the vertical sides of the axle, the free ends of the arms extending beyond the other vertical side of the axle, a bar pivoted to the free end of said long arm and adapted to be swung into and out of engagement with the free end of said short arm, a gravity actuated U-shaped latch pivoted to said short arm and adapted to be swung into and out of embracing contact with the free end of said bar, and a thrust screw having threaded engagement with said bar and adapted to be turned into and out of contact with the other vertical side of the axle, said thrust screw being adapted to hold the bight portion of said frame in firm contact with the axle and prevent any accidental upward movement of the clamp and also adapted to permit the clamp to be applied to axles of different vertical and horizontal dimensions.

In testimony whereof I affix my signature in presence of two witnesses.

OLE HELLAND.

Witnesses:
  MAGNUS HELLAND,
  CONRAD HELLAND.